US012202111B2

(12) United States Patent
Chien

(10) Patent No.: US 12,202,111 B2
(45) Date of Patent: Jan. 21, 2025

(54) ELECTRIC NAIL GUN

(71) Applicant: BASSO INDUSTRY CORP., Taichung (TW)

(72) Inventor: Chia-Yu Chien, Taichung (TW)

(73) Assignee: Basso Industry Corp., Taichung (TW)

( * ) Notice: Subject to any disclaimer, the term of this patent is extended or adjusted under 35 U.S.C. 154(b) by 79 days.

(21) Appl. No.: 18/337,674

(22) Filed: Jun. 20, 2023

(65) Prior Publication Data

US 2023/0415318 A1 Dec. 28, 2023

(30) Foreign Application Priority Data

Jun. 24, 2022 (TW) .................................. 111123716

(51) Int. Cl.
*B25C 1/06* (2006.01)

(52) U.S. Cl.
CPC ...................................... *B25C 1/06* (2013.01)

(58) Field of Classification Search
CPC ........................................................ B25C 1/06
USPC .......................................................... 227/131
See application file for complete search history.

(56) References Cited

U.S. PATENT DOCUMENTS 7,204,403 B2 * 4/2007 Kenney ..................... B25C 1/06 227/120
2009/0032567 A1 * 2/2009 Liang ........................ B25C 1/06 227/131
2009/0194573 A1 * 8/2009 Liang ........................ B25C 1/06 227/129
2022/0040836 A1 * 2/2022 Chien ..................... B25C 1/005
2022/0371166 A1 * 11/2022 Chien ....................... B25C 1/06

FOREIGN PATENT DOCUMENTS

TW I532571 B 5/2016

* cited by examiner

*Primary Examiner* — Praachi M Pathak
(74) *Attorney, Agent, or Firm* — Burris Law, PLLC

(57) ABSTRACT

An electric nail gun includes a flywheel, a swing arm unit, and an actuation unit. The swing arm unit includes a conversion member, and is operable to swing relative to the flywheel in a first direction between an initial position, in which the swing arm unit and the flywheel have a maximum distance therebetween, and a triggered position, in which the swing arm unit and the flywheel have a minimum distance therebetween. The actuation unit includes a pushing member that has a pushing surface facing the conversion member, and a pushing rod that is operable to move relative to the pushing member in the first direction between an extended position, in which the pushing member pushes the conversion member via the pushing surface thereof so that the swing arm unit is in the triggered position, and a retracted position, in which the swing arm unit is in the initial position.

10 Claims, 6 Drawing Sheets

ELECTRIC NAIL GUN

CROSS-REFERENCE TO RELATED APPLICATION

This application claims priority to Taiwanese Invention Patent Application No. 111123716, filed on Jun. 24, 2022.

FIELD

The disclosure relates to an electric nail gun, and more particularly to a flywheel nail gun.

BACKGROUND

Referring to FIG. 1, a conventional electric nail gun 1 disclosed in Taiwanese Invention Patent No. 1532571 includes a frame 11, a flywheel 12 that is rotatably mounted to the frame 11, a swing arm 13 that is pivotably mounted to the frame 11, an impact member 14 that is movably mounted to the swing arm 13 and that is movable relative to the swing arm 13 in a nail-striking direction (P1), a control member 15 that is rotatably mounted to the frame 11, and an actuation unit 16 that is disposed on the frame 11. When the swing arm 13 pivots relative to the frame 11, a distance between the swing arm 13 and the flywheel 12 in a swing direction (P2) changes accordingly. The swing arm 13 has an abutting surface 131. The control member 15 slidably abuts against the abutting surface 131 of the swing arm 13. The actuation unit 16 includes a pushing rod 161 that is movable in the nail-striking direction and that is operable to urge the control member 15 to push the abutting surface 131 so that the swing arm 13 swings toward the flywheel 12. When the swing arm 13 swings toward the flywheel 12, the impact member 14 comes into contact with the flywheel 12 and is urged by rotation of the flywheel 12 to strike a nail.

Because the pushing rod 161 of the actuation unit 16 is designed to move in the nail-striking direction (P1), the control member 15 has to be located at one side of the pushing rod 161 in the nail-striking direction (P1) so that movement of the pushing rod 161 in the nail-striking direction (P1) is able to urge the control member 15 to push the abutting surface 131.

SUMMARY

Therefore, an object of the disclosure is to provide an electric nail gun that has a configuration which is different from the abovementioned prior art.

According to the disclosure, the electric nail gun includes a frame unit, a power unit, a swing arm unit, an impact unit, and an actuation unit. The power unit is mounted to the frame unit, and includes a flywheel that is rotatable. The swing arm unit is pivotably connected to the frame unit and includes a conversion member. The swing arm unit is operable to swing relative to the flywheel in a first direction between an initial position, in which the swing arm unit and the flywheel have a maximum distance therebetween, and a triggered position, in which the swing arm unit and the flywheel have a minimum distance therebetween. The impact unit is adapted for striking a nail, is movably mounted to the swing arm unit, and is operable to be moved by the swing arm unit to come into contact with the flywheel. When the impact unit is in contact with the flywheel, the impact unit is urged by rotation of the flywheel to move in a nail-striking direction that is substantially orthogonal to the first direction. The actuation unit is mounted to the frame unit, and includes a pushing member and an actuation member. The pushing member is rotatable relative to the frame unit and has a pushing surface that faces the conversion member. The actuation member includes a pushing rod that is operable to move relative to the pushing member in the first direction between an extended position, in which the pushing member pushes the conversion member via the pushing surface thereof so that the swing arm unit is in the triggered position, and a retracted position, in which the swing arm unit is in the initial position.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
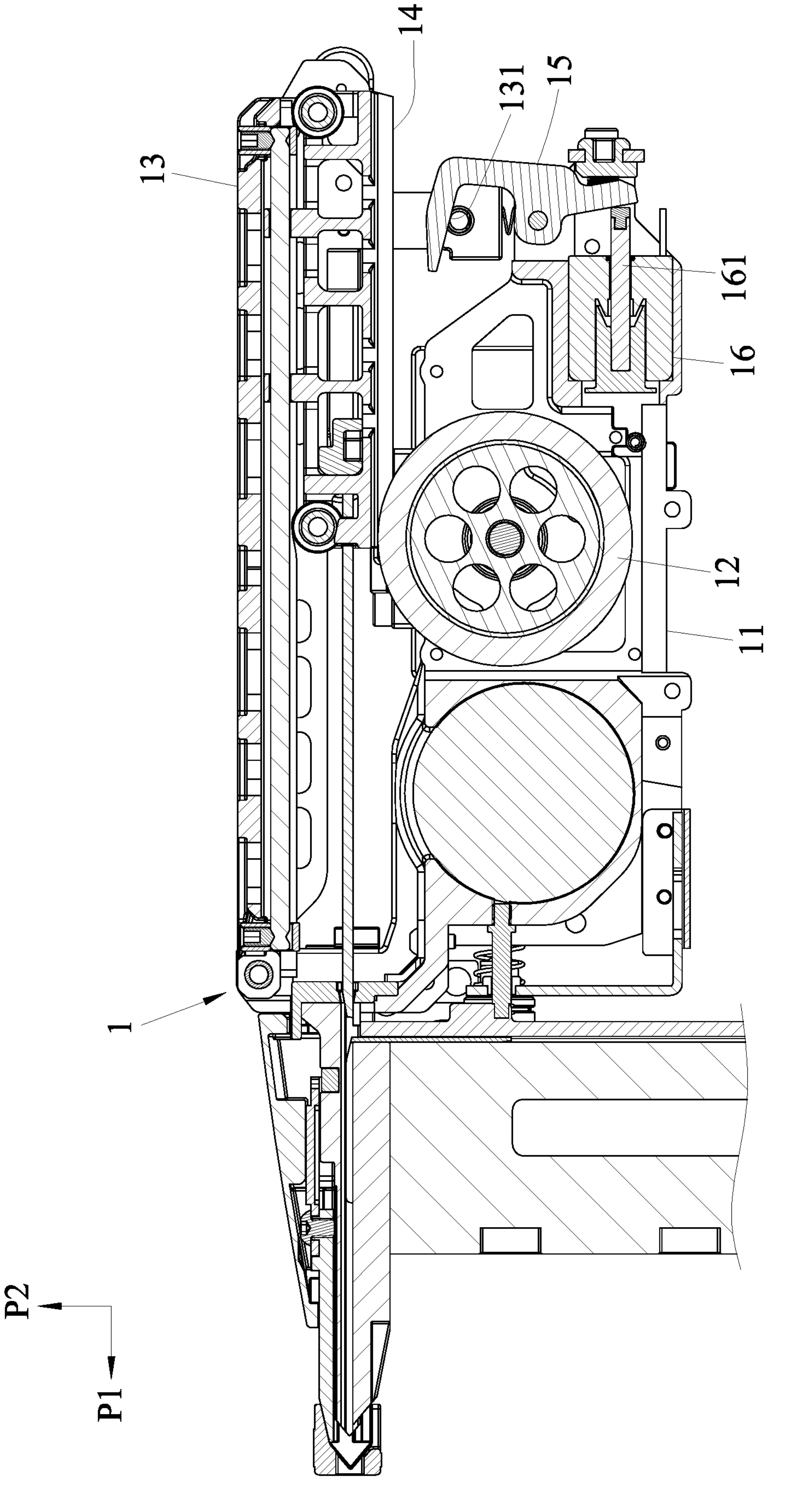
FIG.1 PRIOR ART
FIG. 1 is a fragmentary sectional view of a conventional electric nail gun disclosed in Taiwanese Invention Patent No. 1532571.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
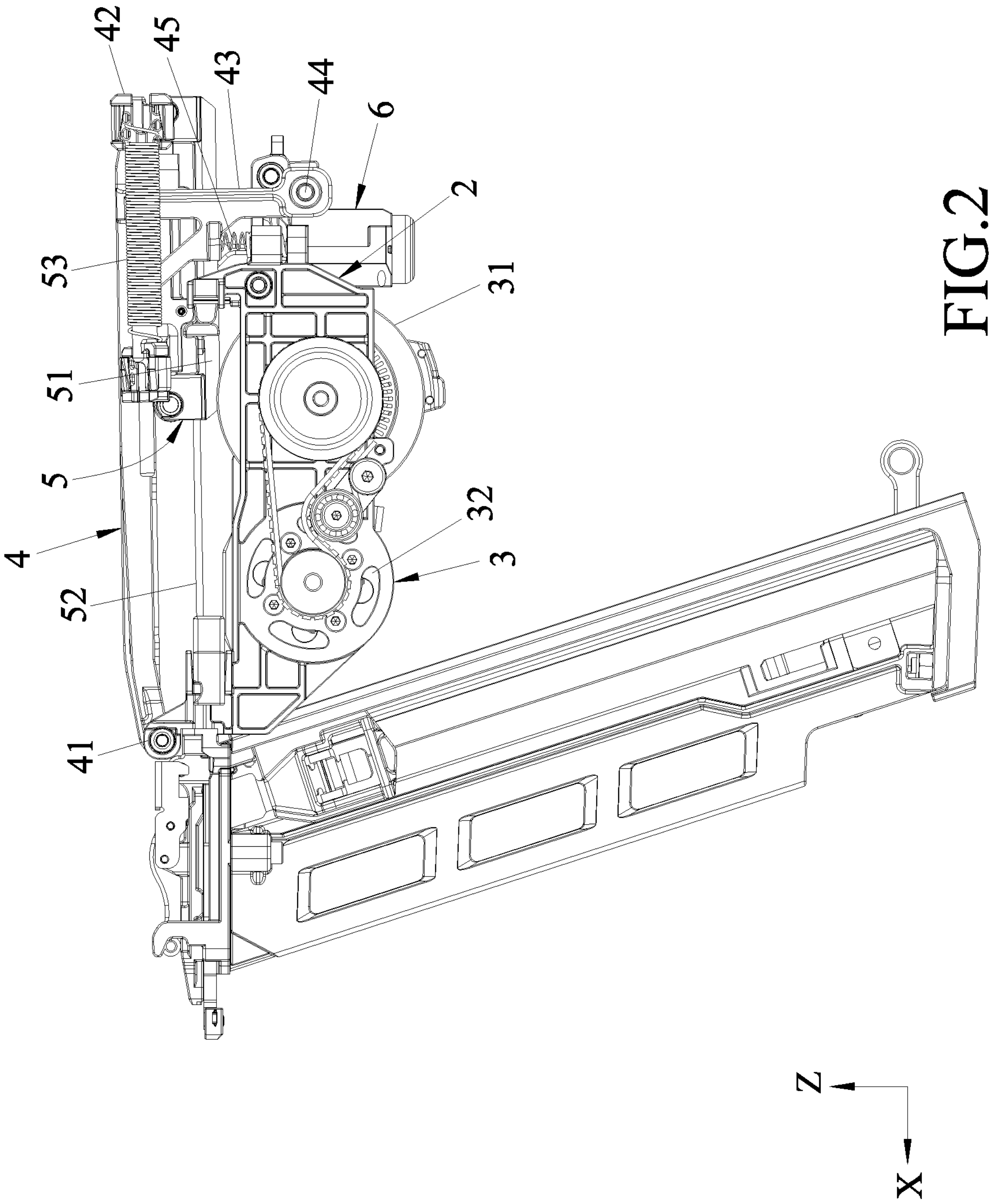
FIG. 2 is a fragmentary side view of an embodiment of an electric nail gun according to the disclosure.
Figure 3:
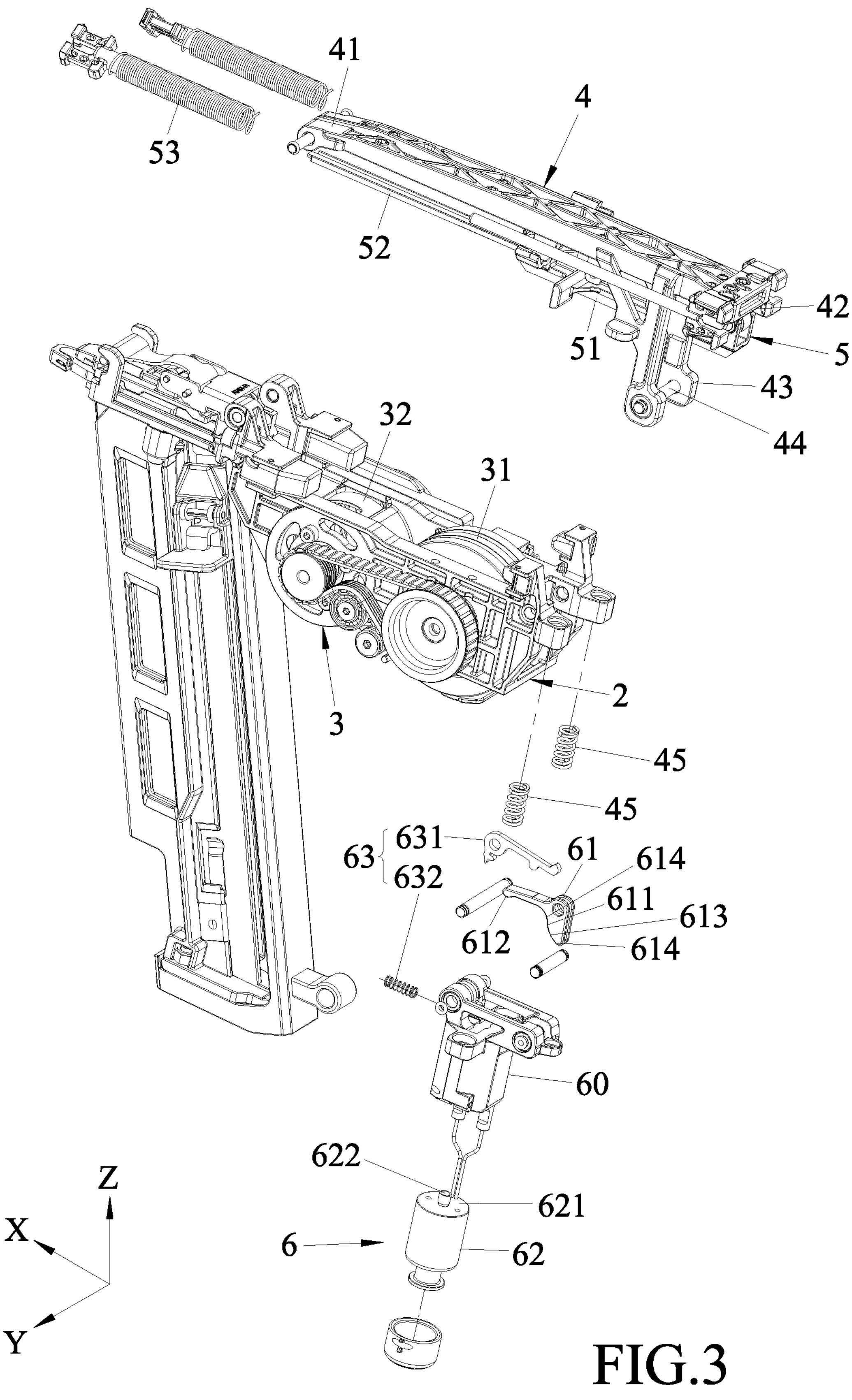
FIG. 3 is a fragmentary, partly exploded perspective view of the embodiment.
Figure 4:
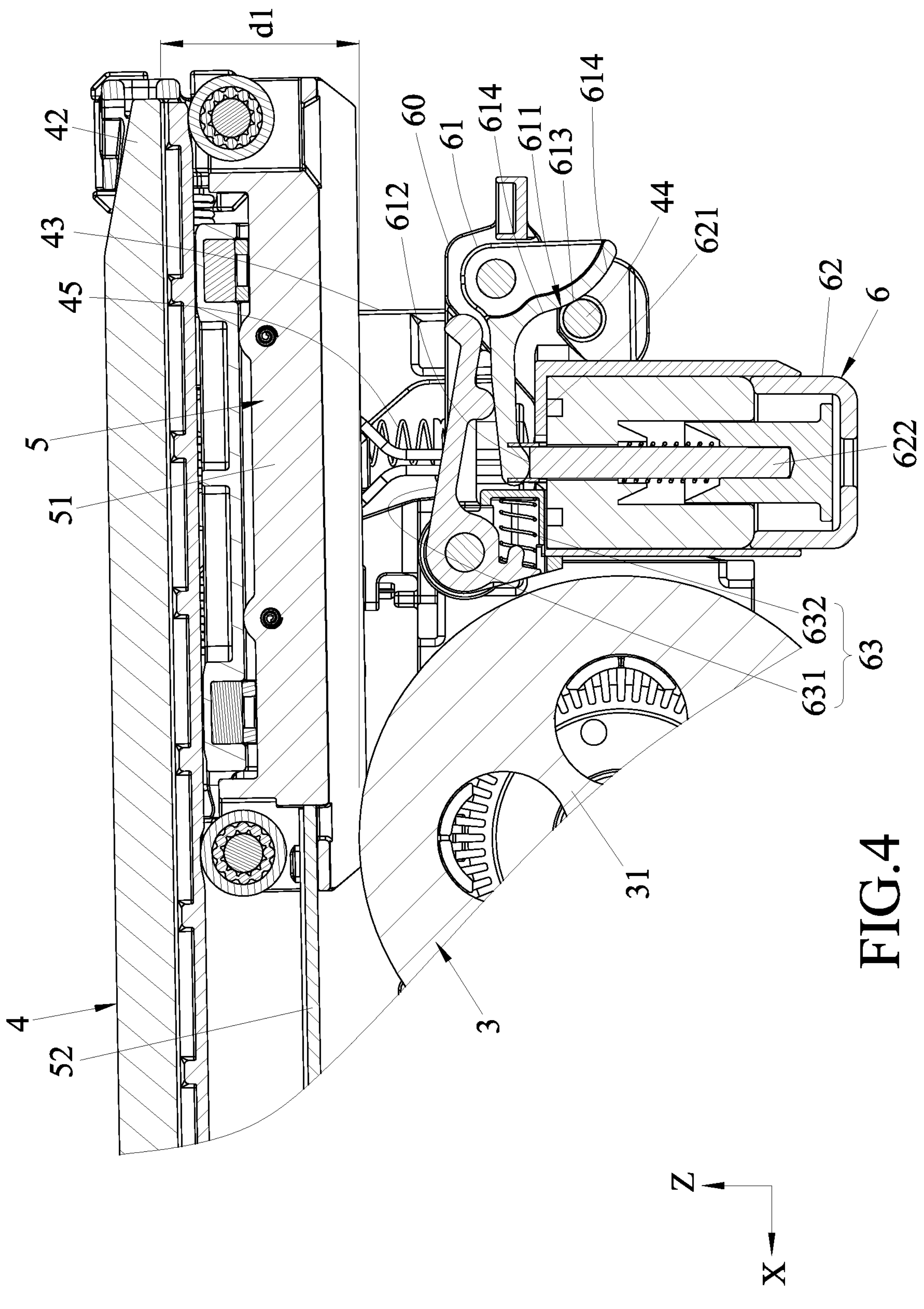
FIG. 4 is a fragmentary sectional view illustrating a swing arm unit of the embodiment in an initial position and a pushing rod of the embodiment in a retracted position.

Referring to FIGS. 2 to 4, an embodiment of an electric nail gun according to the disclosure includes a frame unit 2, a power unit 3, a swing arm unit 4, an impact unit 5, and an actuation unit 6.

The power unit 3 is mounted to the frame unit 2, and includes a flywheel 31 that is rotatably connected to the frame unit 2, and a motor subunit 32 that is used to drive the flywheel 31 to rotate. Consequently, the flywheel 31 is actuated by electric power.

The swing arm unit 4 substantially extends in a nail-striking direction (X), and is pivotably connected to the frame unit 2. The swing arm unit 4 includes a pivot portion 41 that is pivotably mounted to the frame unit 2, a swing portion 42 that is opposite to the pivot portion 41 and that is spaced apart from the flywheel 31, a support frame 43 that is connected to the swing portion 42 and that extends in a first direction (Z), a conversion member 44 that is disposed on the support frame 43 and that is spaced apart from the swing portion 42 in the first direction (Z), and two arm resilient members 45 that are disposed between the frame unit 2 and the swing portion 42 and that are spaced apart from each other in a second direction (Y). In this embodiment, the first direction (Z) is substantially orthogonal to the nail-striking direction (X). The second direction (Y) is substantially orthogonal to the nail-striking direction (X) and the first direction (Z).

Figure 5:
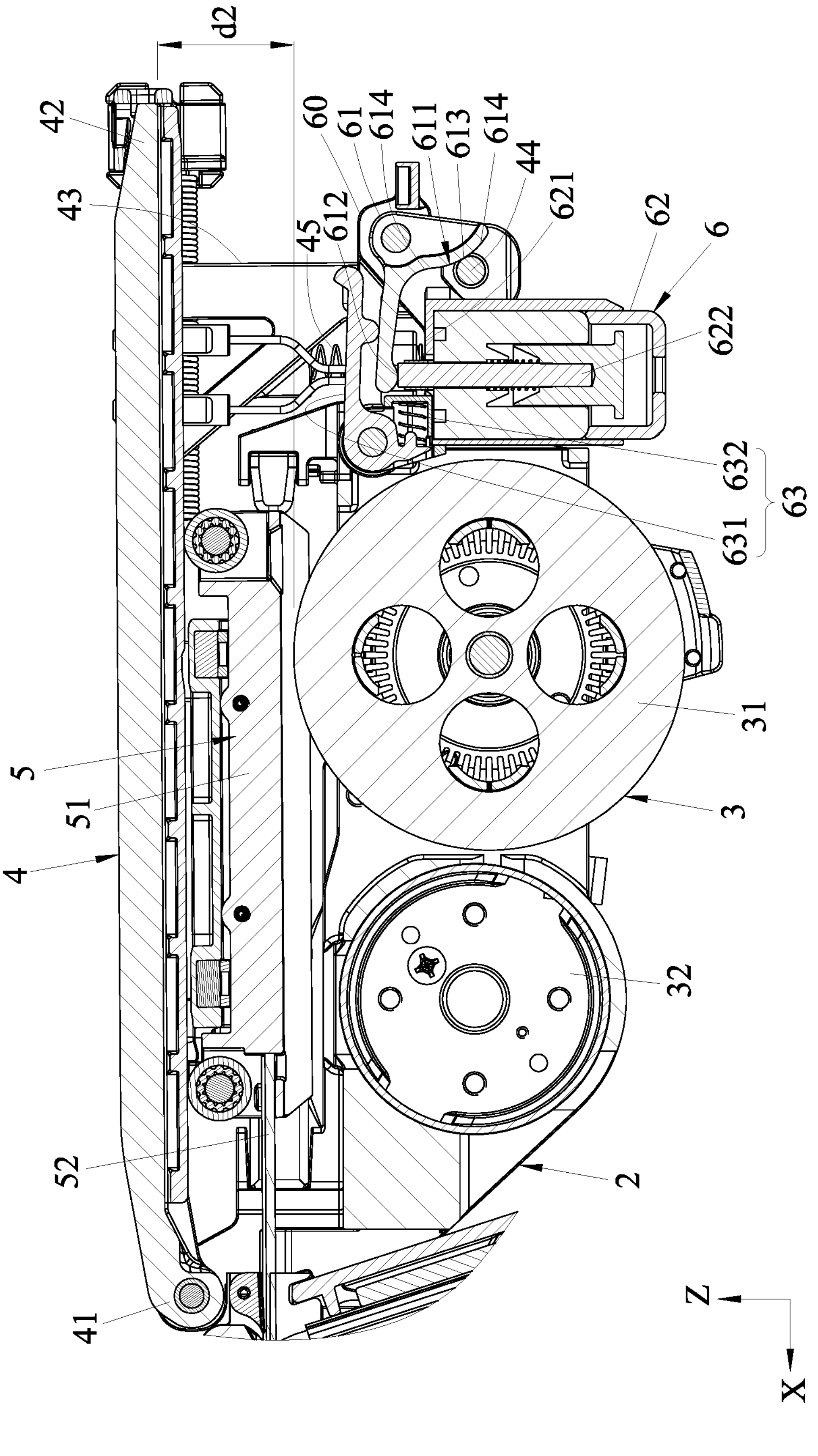
FIG. 5 is a view similar to FIG. 4 but illustrating the swing arm unit in a trigger position and the pushing rod in an extended position.

The swing portion 42 is operable to swing relative to the flywheel 31 in the first direction (Z) between an initial position (see FIGS. 2 and 4) and a triggered position (see FIG. 5). When the swing portion 42 is in the initial position, the swing portion 42 and the flywheel 31 have a maximum distance (d1) (see FIG. 4) therebetween. When the swing portion 42 is in the triggered position, the swing portion 42 and the flywheel 31 have a minimum distance (d2) (see FIG. 5) therebetween.

In the embodiment, the conversion member 44 is configured to be a round rod and extends in the second direction (Y).

Each of the arm resilient members 45 provides a restoring force for the swing portion 42 to move toward the initial position when the swing portion 42 swings away from the initial position.

The impact unit 5 is movably mounted to the swing arm unit 4, and includes an impact member 51 that is movably connected to the swing arm unit 4, a nail-striking rod 52 that is connected to the impact member 51 and that is adapted for striking a nail, and a retrieving subunit 53.

The impact member 51 is operable to be moved by the swing arm unit 4 to come into contact with the flywheel 31. When the impact member 51 is in contact with the flywheel 31, the impact member 51 is urged by rotation of the flywheel 31 to move from a ready position (see FIGS. 2 and 4) to a nail-striking position (see FIG. 6) in the nail-striking direction (X). When the impact member 51 is in the ready position, the impact member 51 is distal from the pivot portion 41 of the swing arm unit 4, and is proximate to the swing portion 42. When the impact member 51 is in the nail-striking position, the impact member 51 is distal from the swing portion 42, and is proximate to the pivot portion 41 (not shown).

In this embodiment, the retrieving subunit 53 is a combination of resilient components, and provides a restoring force for the impact member 51 to move toward the ready position when the impact member 51 is in the nail-striking position.

Referring to FIGS. 3 to 5, the actuation unit 6 includes a casing seat that is connected to the frame unit 2, a pushing member 61 that is rotatably mounted to the casing seat 60, an actuation member 62 that is mounted to the frame unit 2, and an actuation resilient subunit 63 that is disposed between the frame unit 2 and the pushing member 61.

The pushing member 61 is rotatable relative to the frame unit 2, and has a pushing surface 611 that faces the conversion member 44, and a rod-facing surface 612 that cooperates with the pushing surface 611 to define an included angle therebetween. The pushing surface 611 is a curved surface that is convex toward the conversion member 44, and has a peak section 613, and two tail sections 614 that are respectively located at two opposite sides of the peak section 613 and that extend away from the conversion member 44.

It should be noted that each of the pushing surface 611 and the rod-facing surface 612 may not be limited to be a flat surface or a curved surface as shown in FIGS. In one embodiment, each of the pushing surface 611 and the rod-facing surface 612 may be an irregular surface as a surface of a cam.

The actuation member 62 has an end surface 621 that faces the swing arm unit 4, and a pushing rod 622 that is movable in the first direction (Z). The rod-facing surface 612 of the pushing member 61 faces the pushing rod 622, and is in contact with an end of the pushing rod 622. The pushing rod 622 is operable to move relative to the pushing member 61 in the first direction (Z) between an extended position (see FIG. 5) and a retracted position (see FIG. 4). When the pushing rod 622 is in the extended position, the end of the pushing rod 622 is located above the end surface 621, and is distal from the end surface 621. When the pushing rod 622 is in the retracted position, the end of the pushing rod 622 is lowered such that the end of the pushing rod 622 is proximate to the end surface 621. During movement of the pushing rod 622 from the retracted position to the extended position in the first direction (Z), the pushing rod 622 pushes the rod-facing surface 612 of the pushing member 61 upwardly away from the end surface 621 such that the pushing member 61 rotates relative to the frame unit 2 in a first rotating direction, and pushes the conversion member 44 via the peak section 613 of the pushing surface 611 thereof to urge the swing arm unit 4 to move from the initial position to the triggered position. Consequently, when the pushing rod 622 is in the extended position, the rod-facing surface 612 is distal from the end surface 621, the conversion member 44 is pushed by the peak section 613 of the pushing surface 611, and the swing arm unit 4 is in the triggered position. During movement of the pushing rod 622 from the extended position to the retracted position, the pushing rod 622 moves downwardly such that the pushing member 61 rotates in a second rotating direction opposite to the first rotating direction, that the conversion member 44 is free from a pushing force of the pushing member 61, and that the rod-facing surface 612 of the pushing member 61 gets closer to the end surface 621. Consequently, when the pushing rod 622 is in the retracted position, the rod-facing surface 612 is proximate to the end surface 621, the conversion member 44 is proximate to one of the tail sections 614 of the pushing surface 611 that is proximate to the rod-facing surface 612 (i.e., the upper one of the tail sections 614) and is distal from the other one of the tail sections 614 that is distal from the rod-facing surface 612 (i.e., the lower one of the tail sections 614), and the swing arm unit 4 is in the initial position.

In this embodiment, the actuation member 62 is configured to be a solenoid valve. The pushing rod 622 is urged to be in the extended position by magnetic force when the actuation member 62 is energized. The pushing rod 622 is in the retracted position when the actuation member 62 is powered off.

Figure 6:
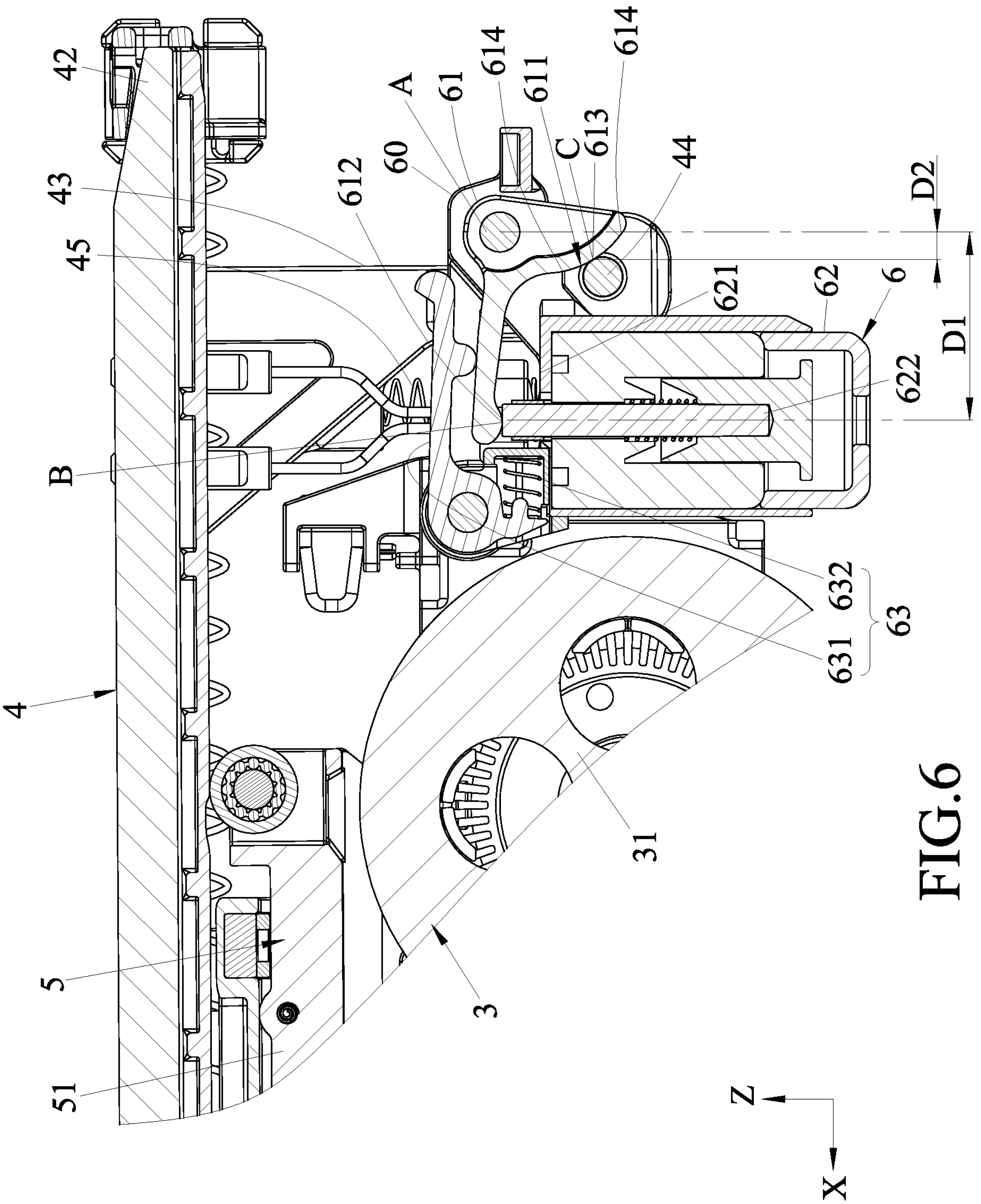
FIG. 6 is a fragmentary sectional view illustrating that an impact unit of the embodiment is urged by a flywheel of the embodiment to move.

Referring to FIG. 6, it is noted that, because the pushing member 61 is rotatably mounted to the casing seat 60 and the casing seat 60 is connected to the frame unit 2, the actuation unit 6 defines a pivot point (A) at a joint of the pushing member 61 and the casing seat 60. The pushing member 61 is rotatable about the pivot point (A) relative to the frame unit 2. The pushing rod 622 is operable to push the rod-facing surface 612 such that the rod-facing surface 612 rotates about the pivot point (A). Because the rod-facing surface 612 is in contact with the pushing rod 622, the rod-facing surface 612 cooperates with the pushing rod 622 to define an effort point (B) at which the rod-facing surface 612 and the pushing rod 622 are in contact with each other. When the pushing member 61 pushes the conversion member 44 via the pushing surface 611 thereof, the pushing surface 611 cooperates with the conversion member 44 to define a resistance point (C) at which the pushing surface 611 and the conversion member 44 are in contact with each other. The resistance point (C) is located between the pivot point (A) and the effort point (B) in the nail-striking direction (X). A distance (D1) between the effort point (B) and the pivot point (A) in the nail-striking direction (X) is greater than a distance (D2) between the resistance point (C) and the pivot point (A) in the nail-striking direction (X). As such, by virtue of the rod-facing surface 612 and the pushing surface 611 cooperatively defining the included angle therebetween, and by virtue of the distance (D1) being greater than the distance (D2), a pushing force of the pushing rod 622 that acts toward the pushing member 61 may result in the pushing force of the pushing member 61 that acts toward the conversion member 44 being greater than the pushing force of the pushing rod 622, and the size of the embodiment may be reduced.

The actuation resilient subunit 63 resiliently biases the pushing member 61 so that the pushing member 61 is urged to move toward the pushing rod 622 when being free from an external force. Specifically, the actuation resilient subunit 63 includes a rotating arm 631 that is rotatably connected to the casing seat 60, and an actuation resilient member 632 that resiliently biases the casing seat 60 and an end of the rotating arm 631 so that another end of the rotation arm 631 pushes the pushing member 61 to urge the pushing member 61 to push the pushing rod 622 toward the retracted position.

Referring to FIG. 5 again, when the actuation member 62 is not energized, the arm resilient members 45 resiliently bias the swing portion 42 such that the swing portions 42 is in the initial position, and the retrieving subunit 53 resiliently biases the impact member 51 such that the impact member 51 is in the ready position. Because the impact member 51 is connected to the swing arm unit 4, the maximum distance (d1) between the swing portion 42 and the flywheel 31 keeps the impact member 51 away from the flywheel 31 (i.e., the impact member 51 is spaced apart from the flywheel 31). At this time, the actuation resilient subunit 63 resiliently biases the pushing member 61 such that the pushing member 61 is urged by the actuation resilient subunit 63 to rotate in the second rotating direction and to keep the pushing rod 622 in the retracted position. The rod-facing surface 612 is proximate to the end surface 621, and the conversion member 44 is proximate to the upper one of the tail sections 614.

Referring to FIGS. 5 and 6 again, when the flywheel 31 is driven by the motor subunit 32 to rotate in the second rotating direction at a predetermined rotational speed, the pushing rod 622 may be urged to move toward the extended position in the first direction by the magnetic force once the actuation member 62 has been energized. At this time, the pushing rod 622 urges the pushing member 61 to rotate in the first rotating direction such that the rod-facing surface 612 is moved away from the end surface 621, and that the peak section 613 of the pushing surface 611 pushes the conversion member 44. When the peak section 613 pushes the conversion member 44, the swing portion 42 presses the arm resilient members 45 and swings toward the triggered position such that the swing portion 42 gets closer to the flywheel 31, and that the impact member 51 connected to the swing arm unit 4 is urged to move toward the flywheel 31. Afterwards, when the impact member 51 is in contact with the flywheel 31, the impact member 51 is urged by the rotation of the flywheel 31 to move from the ready position to the nail-striking position (toward the pivot portion 41) in the nail-striking direction (X) such that the nail-striking rod 52 strikes the nail.

After the nail-striking rod 52 strikes the nail, the actuation member 62 is de-energized. At this time, the pushing member 61 is resiliently biased by the actuation resilient subunit 63 such that the pushing member 61 rotates in the second rotating direction and pushes the pushing rod 622 to return to the retracted position. When the pushing rod 622 is in the retracted position (i.e., the rod-facing surface 612 is proximate to the end surface 621 of the actuation member 62, and the conversion member 44 is proximate to the upper one of the tail sections 614 of the pushing surface 611), the conversion member 44 is free from the pushing force of the pushing member 61 such that the swing portion 42 is resiliently biased by the arm resilient members 45, and swings away from the flywheel 31 and back to the initial position in the first direction (Z). At this time, the impact member 51 is resiliently biased by the retrieving subunit 53 such that the impact member 51 moves from the nail-striking position to the ready position (toward the swing portion 42).

In summary, the embodiment of the electric nail gun offers several benefits as follows. By virtue of the pushing rod 622 being movable in the first direction (Z) and operable to push the pushing member 61 in the first direction (Z), and by virtue of rotation of the pushing member 61 resulting in the pushing force of the pushing member 61 acting toward the conversion member 44, the swing arm unit 4 may swing in a direction parallel to a direction of the pushing force of the pushing rod 622 that acts toward the pushing member 61 (i.e., the swing direction (Z)), which may reduce a length of the electric nail gun in the nail-striking direction (X). In addition, the size of the electric nail gun may thus be reduced, which saves space.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electric nail gun comprising:

a frame unit;

a power unit mounted to the frame unit and including a flywheel that is rotatable;

a swing arm unit pivotably connected to the frame unit and including a conversion member, the swing arm unit being operable to swing relative to the flywheel in a first direction between an initial position, in which the swing arm unit and the flywheel have a maximum distance therebetween, and a triggered position, in which the swing arm unit and the flywheel have a minimum distance therebetween;

an impact unit adapted for striking a nail, movably mounted to the swing arm unit, and operable to be moved by the swing arm unit to come into contact with the flywheel, when the impact unit is in contact with the flywheel, the impact unit being urged by rotation of the flywheel to move in a nail-striking direction that is substantially orthogonal to the first direction; and an actuation unit mounted to the frame unit and including a pushing member and an actuation member, the pushing member being rotatable relative to the frame unit and having a pushing surface that faces the conversion member, the actuation member including a pushing rod that is operable to move relative to the pushing member in the first direction between an extended position, in which the pushing member pushes the conversion member via the pushing surface thereof so that the swing arm unit is in the triggered position, and a retracted position, in which the swing arm unit is in the initial position.

2. The electric nail gun as claimed in claim 1, wherein the swing arm unit extends in the nail-striking direction, and further includes a pivot portion that is pivotably mounted to the frame unit, a swing portion that is opposite to the pivot portion and that is spaced apart from the flywheel, and a support frame that is connected to the swing portion and that extends in the first direction, the conversion member being disposed on the support frame and being spaced apart from the swing portion in the first direction.

3. The electric nail gun as claimed in claim 2, wherein the conversion member is configured to be a round rod and extends in a second direction that is substantially orthogonal to the nail-striking direction and the first direction.

4. The electric nail gun as claimed in claim 1, wherein the actuation member is configured to be a solenoid valve, the pushing rod being urged to be in the extended position when the actuation member is energized, and being in the retracted position when the actuation member is powered off.

5. The electric nail gun as claimed in claim 1, wherein the actuation unit defines a pivot point, the pushing member being rotatable about the pivot point relative to the frame unit, and further having a rod-facing surface that cooperates with the pushing surface to define an included angle therebetween and that faces the pushing rod, the pushing rod being operable to push the rod-facing surface such that the rod-facing surface rotates about the pivot point.

6. The electric nail gun as claimed in claim 5, wherein the rod-facing surface is in contact with the pushing rod, and cooperates with the pushing rod to define an effort point at which the rod-facing surface and the pushing rod are in contact with each other, when the pushing member pushes the conversion member via the pushing surface, the pushing surface cooperating with the conversion member to define a resistance point at which the pushing surface and the conversion member are in contact with each other, the resistance point being located between the pivot point and the effort point in the nail-striking direction, a distance between the effort point and the pivot point in the nail-striking direction being greater than a distance between the resistance point and the pivot point in the nail-striking direction.

7. The electric nail gun as claimed in claim 5, wherein the pushing surface is a curved surface that is convex toward the conversion member, and has a peak section, and two tail sections that are respectively located at two opposite sides of the peak section and that extend away from the conversion member, the peak section of the pushing surface pushing the conversion member when the pushing rod is in the extended position, when the pushing rod is in the retracted position, the conversion member being proximate to one of the tail sections of the pushing surface and being distal from the other one of the tail sections.

8. The electric nail gun as claimed in claim 7, wherein the actuation member has an end surface that faces the swing arm unit, the rod-facing surface being in contact with an end of the pushing rod, when the pushing rod is in the extended position, the end of the pushing rod being distal from the end surface such that the rod-facing surface is distal from the end surface, when the pushing rod is in the retracted position, the end of the pushing rod being proximate to the end surface such that the rod-facing surface is proximate to the end surface.

9. The electric nail gun as claimed in claim 8, wherein the actuation unit includes an actuation resilient subunit that is disposed between the pushing member and the frame unit, and that resiliently biases the pushing member so that the pushing member is urged to move toward the pushing rod when being free from an external force.

10. The electric nail gun as claimed in claim 9, wherein the actuation unit further includes a casing seat that is connected to the frame unit, the actuation resilient subunit including a rotation arm that is rotatably connected to the casing seat, and an actuation resilient member that resiliently biases the casing seat and an end of the rotation arm so that another end of the rotation arm pushes the pushing member to urge the pushing member to push the pushing rod toward the retracted position.

* * * * *